Aug. 12, 1952  R. G. HARRIS  2,606,731
ROD AND REEL HOLDER
Filed April 13, 1950  2 SHEETS—SHEET 1
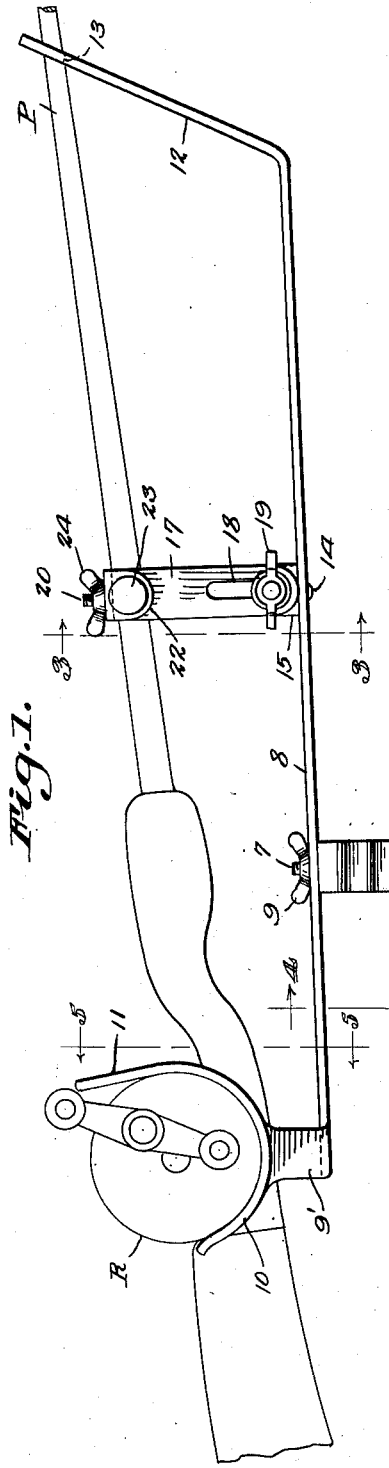
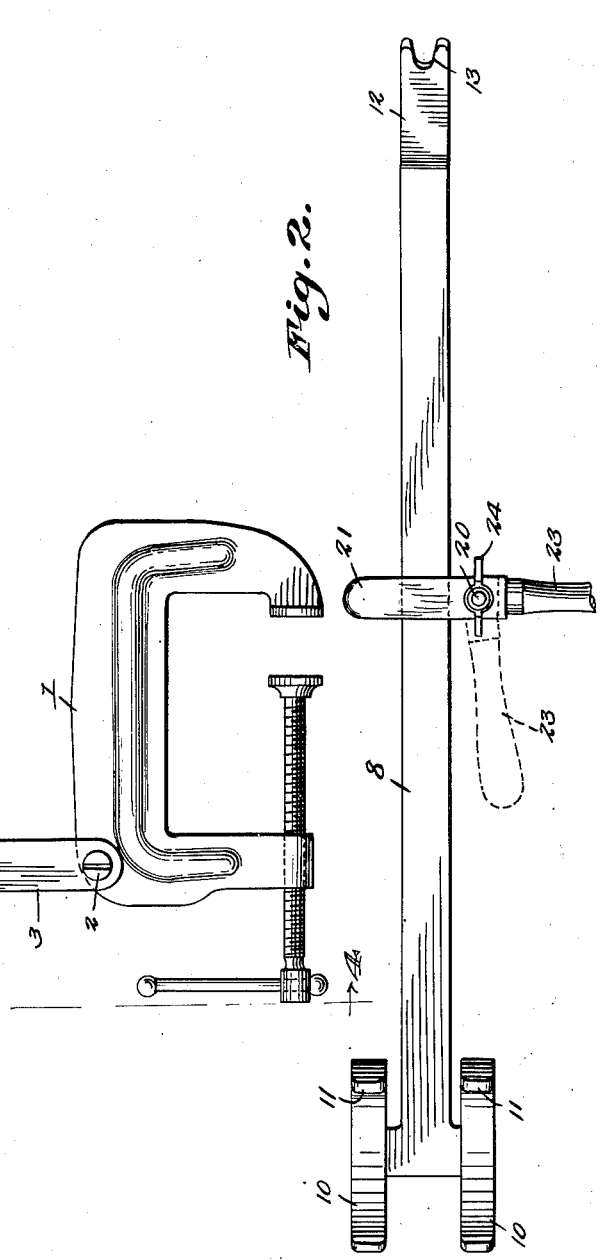
R. G. Harris
INVENTOR
BY *C. A. Snow & Co.*
ATTORNEYS.

Aug. 12, 1952 R. G. HARRIS 2,606,731
ROD AND REEL HOLDER
Filed April 13, 1950 2 SHEETS—SHEET 2
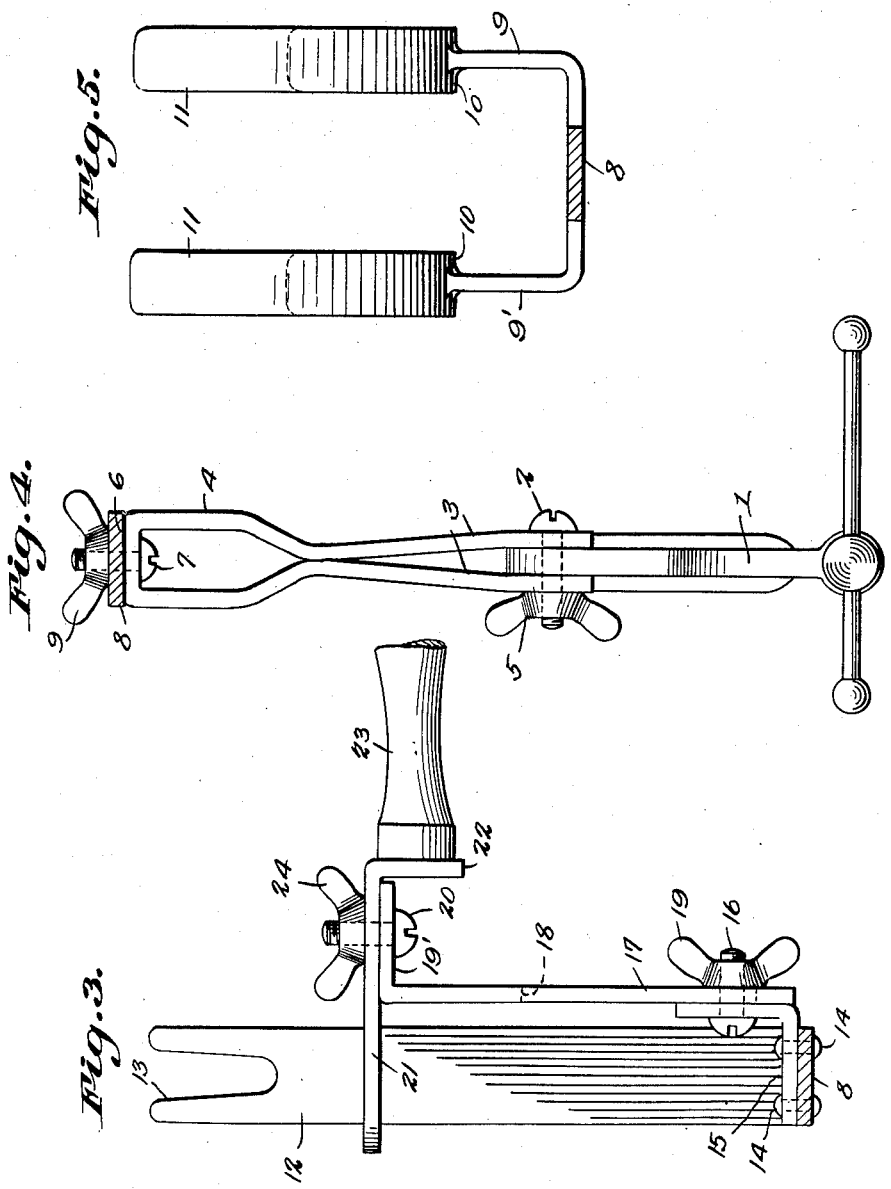
R.G. Harris
INVENTOR
BY C.A.Snow&Co.
ATTORNEYS.

Patented Aug. 12, 1952

2,606,731

UNITED STATES PATENT OFFICE 2,606,731

ROD AND REEL HOLDER

Raymond G. Harris, McKinney, Tex.

Application April 13, 1950, Serial No. 155,758

3 Claims. (Cl. 248—42)

1

This invention relates to a rod and reel holder, adapted to be used by fishermen for the purpose of supporting a fishing rod while awaiting a strike.

It is well appreciated by fishermen that the continual holding of a fishing rod in the hand over long periods of time, as for example during trolling operations from a small boat, can become quite tiresome. Merely to place the rod upon the bottom of the boat with the tip projecting over the side of the boat is no solution of the problem, since the rod is in the way, and can easily be pulled or accidentally pushed overboard.

As a result, there have already been devised holders for fishing rods adapted to be clamped or otherwise secured to the boat, where the rod can be grasped by the fisherman and removed from the holder when a fish strikes.

However, these devices as heretofore devised have had certain objections, to my knowledge. For example, no such device has been previously constructed, so far as I know, that permits the rod to be lifted straight upwardly off the holder in a manner to permit the fisherman to grasp the rod instantaneously for the purpose of playing the fish. In some instances, the holders as heretofore constructed have had rod-receiving openings, so that the rod must be given endwise movement first before being given an upward movement. In others cross bars are embodied in the device, so that the rod must be given a lateral movement before being given an upward movement. In both instances, the operation of removing the rod from the holder is time consuming, at a time when every second counts.

Additionally, some holders as previously constructed have not been designed, I believe, in a manner to protect the rod against being accidentally pulled from the holder and lost overboard. In other instances the rod cannot be positioned out of the way when not in use.

The present invention aims to provide a holder for the purposes stated which will eliminate all the objections noted above, and which will additionally be capable of construction at relatively low cost, will be quite durable, and of small, conveniently portable size.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a side elevational view of a rod and reel holder formed in accordance with the present invention, a portion of a supported rod being illustrated in position upon said holder.

Fig. 2 is a top plan view, the dotted lines indicating a releasing position of a latch means embodied in the holder.

2

Fig. 3 is a section, taken on line 3—3 of Fig. 1, on an enlarged scale.

Fig. 4 is an enlarged section on line 4—4 of Fig. 1.

Fig. 5 is an enlarged section on line 5—5 of Fig. 1.

Referring to the drawings in detail, a C clamp 1 is of thoroughly conventional construction and constitutes per se no part of the present invention, this clamp being adapted to grip any portion of the boat, such as the gunwale, in a manner to clamp the rod and reel holder securely to said boat portion.

Secured by a bolt 2 to the clamp 1 are the arms 3 of a yoke 4, said arms straddling the clamp, as readily seen in Fig. 4, a wing nut 5 being threaded upon the bolt to secure the vertically swingable yoke in any selected position of pivotal adjustment relative to the clamp 1.

As readily seen from Fig. 4, the yoke 4 has a flat top surface 6 formed with an opening through which extends upwardly the bolt 7 passing through openings formed in the medial portion of an elongated supporting bar 8, a wing nut 9 threading upon the screw 7 for the purpose of securing the supporting bar 8 rigidly in any selected position of horizontally swingable adjustment.

Formed integrally with the supporting bar 8 at the rear end thereof are the upwardly extended spaced arms 9' rigid at their upper ends with the arcuate seats 10 for supporting the opposite sides of the reel R of a pole P, said seats being extended upwardly a substantial distance at their front ends, as at 11, for the purpose of providing abutments or guards which will prevent the reel from being pulled forwardly from the seat 10 when a heavy strike occurs.

The front end of the bar 8 is formed with an upwardly inclined front end portion or leg 12 having the pole-receiving notch 13.

That portion of the pole disposed between the reel seat 10 and the notch 13 is held down by a releasable latch means. Rivets 14 or equivalent fastening means (see Fig. 3) immovably secure to the supporting bar 8 one end of an angle bracket 15, the upwardly extended portion of which is formed with an opening through which extends the screw 16, comprising a means for connection to the bracket 15 of the lower end of an adjustable latch support or post 17, said latch support or post 17 having the elongated closed slot 18 through which said screw 16 passes, for vertical adjustment of the support 17 relative to the stationary bracket 15. Wing nut 19 threads upon screw 16 for the purpose of clamping the latch support 17 in selected positions of vertical adjustment.

Formed upon the upper end of the latch support or post 17 is the laterally extended ledge 19' formed with an opening through which extends upwardly the screw 20, that connects to the ledge the horizontally swingable latch bar or tongue 21, one end of said latch bar having the downturned portion 22 to which is secured the operating handle 23 of said latch. Wing nut 24 threads upon the screw 20 for the purpose of securing the connection, but the latch bar or tongue 21 is left more or less free for horizontal swinging movement upon the ledge 19'.

The latch bar or tongue 21 is here illustrated as being of flat construction. However, it will be understood that it could be in the form of a cylindrical spindle or the like on which might be mounted a rubber tubing section, so as to protect the pole P against being marred by engagement with said latch bar. This is believed sufficiently obvious as not to require special illustration.

Considering the use of the device, it may first be noted that the holder is capable of adjustment through a vertical plane upon the pivot member 2 of the clamp, so as to adjust the elevation of the rod as desired. When the rod has been adjustably positioned as to elevation, the wing nut 5 is tightened for the purpose of rigidly holding the device in the selected position of adjustment.

Further adjustment of the rod holding part of the device is now achieved by horizontally swinging the bar 8 upon the pivot member 7 carried by the top of the yoke 4. This is desirable so as to swing the rod tip laterally to any selected location relative to the boat on which the holder is mounted, for placing the rod at the optimum location for fishing operations. This horizontally swinging or swiveled adjustment of the holder is desirable, additionally, for the purpose of permitting the holder and the supported rod to be positioned out of the way of the occupants of the boat and/or the various gear which might be located in the boat, thus to eliminate the possibility of damage of the rod at any time when it is not actually being used for fishing operations.

Assuming that the device is to be used to support a pole P equipped with reel R during fishing operations, the handle 23 is grasped and swung laterally to the dotted line position illustrated in Fig. 2. As a result, the free end of the latch bar 21 is swung away from the full line position illustrated in Fig. 2, and the user may now simply position the pole P in the notch 13 and the reel R in the saddle 10. The handle 23 is now swung back to the full line position, so that the latch bar 21 extends over the pole P. As a result, the pole is locked in the device against accidental removal. For example, the pole cannot be accidentally jarred by an occupant in the boat and knocked off the holder and lost overboard.

Further, should a strike occur, endwise movement of the pole caused by pulling exerted upon the line by the caught fish is prevented completely by the upwardly extended portions 11 of the saddle that engage the reel R against said endwise pole movement.

Of further importance, concerning the action of the device when a strike occurs, is the fact that the reel saddle is specifically designed in a manner to permit free line movement from the reel, this being provided for by elevation of the saddle above the supporting bar 8, and support of the reel at the sides only, the line-holding portion of the reel being left completely clear of interference on the occurrence of a strike.

However, when a strike occurs the pole is instantaneously ready for action, because the fisherman simply strikes the handle 23 so as to swing it to the dotted line position of Fig. 2, after which the pole is lifted vertically off the device. This operation is in effect instantaneous, the fisherman swinging the handle 23 with one hand while at the same time grasping and lifting the pole with the other. The action of removing the pole does not involve initial endwise or lateral movement, the pole being lifted straight upwardly off the device.

When the pole is to be returned to the device, the latch bar 21 is again returned to the full line position of Fig. 2. Also, the latch is left in the full line position illustrated whenever the pole is to be positioned inoperatively, as for example, during movement of the boat to and from the fishing grounds.

The slide 18, it may be noted, provides means for vertical adjustment of the entire latch mechanism, so as to adjust said latch mechanism for rods of different designs and thicknesses.

What is claimed is:

1. In a rod and reel holder an elongated supporting bar, an upwardly and outwardly extending leg carried by the bar adjacent one end thereof, said leg having a pole receiving notch opening through its upper end, upwardly extending spaced parallel arcuate reel end receiving seats carried by the bar adjacent the end thereof remote from the leg, guards carried by the arcuate reel receiving seats intermediate the ends of the bar, and said guards inclining upwardly and outwardly in a direction opposite the leg for preventing accidental dislodgement of a reel from its position in the seats.

2. In a rod and reel holder an elongated supporting bar, an upwardly and outwardly extending leg carried by the bar adjacent one end thereof, said leg having a pole receiving notch opening through its upper end, upwardly extending spaced parallel arcuate reel end receiving seats carried by the bar adjacent the end thereof remote from the leg, an upwardly extending post carried by the bar intermediate the leg and the seats, and a latch tongue mounted on the post for horizontal swinging movement across a rod resting in the notch.

3. In a rod and reel holder an elongated supporting bar, an upwardly and outwardly extending leg carried by the bar adjacent one end thereof, said leg having a pole receiving notch opening through its upper end, upwardly extending spaced parallel arcuate reel end receiving seats carried by the bar adjacent the end thereof remote from the leg, guards carried by the arcuate reel receiving seats intermediate the ends of the bar, said guards inclining upwardly and outwardly in a direction opposite the leg for preventing accidental dislodgement of a reel from its position in the seats, an upwardly extending post carried by the bar intermediate the leg and the seats, and a latch tongue mounted on the post for horizontal swinging movement across a rod resting in the notch.

RAYMOND G. HARRIS.

REFERENCES CITED

The following references are of record in the file of this patent:

UNITED STATES PATENTS

| Number | Name | Date |
| --- | --- | --- |
| 2,249,302 | Smith | July 15, 1941 |
| 2,309,350 | Nauasko | Jan. 26, 1943 |
| 2,311,823 | Gaskill | Feb. 23, 1943 |
| 2,454,458 | Kaetker | Nov. 23, 1948 |
| 2,522,255 | Climo | Sept. 12, 1950 |